(12) United States Patent
Sharangpani et al.

(10) Patent No.: US 6,237,077 B1
(45) Date of Patent: *May 22, 2001

(54) INSTRUCTION TEMPLATE FOR EFFICIENT PROCESSING CLUSTERED BRANCH INSTRUCTIONS

(75) Inventors: Harshvardhan Sharangpani, Santa Clara; Michael Paul Corwin, Palo Alto; Dale Morris, Menlo Park; Kent Fielden, Sunnyvale; Tse-Yu Yeh, Milpitas; Hans Mulder, San Francisco; James Hull, Cupertino, all of CA (US)

(73) Assignee: Idea Corporation, Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/949,277

(22) Filed: Oct. 13, 1997

(51) Int. Cl.[7] .................................................. G06F 9/38
(52) U.S. Cl. ........................... 712/24; 712/215; 712/234; 712/241; 717/6
(58) Field of Search .................................. 712/215, 206, 712/24, 212, 226, 241; 717/234, 6

(56) References Cited

U.S. PATENT DOCUMENTS

| | | | |
|---|---|---|---|
| 4,833,599 | * 5/1989 | Colwell et al. | 395/588 |
| 5,333,280 | * 7/1994 | Ishikawa et al. | 395/588 |
| 5,414,822 | * 5/1995 | Saito et al. | 395/587 |
| 5,655,098 | 8/1997 | Witt et al. | |
| 5,699,536 | * 12/1997 | Hopkins et al. | 395/392 |
| 5,699,537 | 12/1997 | Sharangpani et al. | |
| 5,729,728 | 3/1998 | Colwell et al. | |
| 5,742,804 | 4/1998 | Yeh et al. | |
| 5,742,805 | 4/1998 | Kulkarni et al. | |
| 5,826,070 | * 10/1998 | Olson et al. | 395/563 |
| 5,860,017 | 1/1999 | Sharangpani et al. | |
| 5,903,750 | 5/1999 | Yeh et al. | |

OTHER PUBLICATIONS

Sharangpani, Harsh, "Intel Itanium Processor Microarchitecture Overview",Intel, http://www.intel.comon Oct. 19, 1999. all pages.

Tom Shanley, Pentium Pro Processor System Architecture, 1997, pp. 63–89, MindShare, Inc. Published simultaneously in Canada.

* cited by examiner

*Primary Examiner*—Eddie Chan
*Assistant Examiner*—Gautam R. Patel
(74) *Attorney, Agent, or Firm*—Leo V. Novakoski (57) ABSTRACT

A method for processing one or more branch instructions in an instruction bundle is provided. The instructions are ordered in an execution sequence within the bundle, with the branch instructions ordered last in the sequence. The bundled instructions are transferred to execution units indicated by a template field that is associated with the bundle. The first branch instruction in the bundle's execution sequence that is resolved taken is determined, and retirement of subsequent instructions in the execution sequence is suppressed.

7 Claims, 8 Drawing Sheets

INSTRUCTION TEMPLATE FOR EFFICIENT PROCESSING CLUSTERED BRANCH INSTRUCTIONS

BACKGROUND OF THE INVENTION

1. Technical Field

This invention relates to microprocessor architecture, and in particular to a system and method for processing branch instructions.

2. Background Art

Modem processors have the capacity to process multiple instructions concurrently at very high rates, with processor pipelines being clocked at frequencies that are rapidly approaching the gigahertz regime. Despite the impressive capabilities of these processors, their actual instruction throughput on a broad cross-section of applications is often limited by a lack of parallelism among the instructions to be processed. While there may be sufficient resources to process, for example, six instructions concurrently, dependencies between the instructions rarely allow all six execution units to be kept busy.

The problem is magnified by the long latency of certain operations that gate subsequent instructions. For example, long latency on a load instruction delays the execution of instructions that depend on the data being loaded. Likewise, long latency instruction fetches triggered by branch instructions starve the processor pipeline of instructions to execute. Memory latency problems are exacerbated on programs that have working sets too large to fit in the nearest level cache. The result can be significant under-utilization of processor resources. Consequently, there has been an increasing focus on methods to identify and exploit the instruction level parallelism ("ILP") needed to fully utilize the capabilities of modem processors.

Different approaches have been adopted for identifying ILP and exposing it to the processor resources. For example, Reduced Instruction Set Computer (RISC) architectures employ relatively simple, fixed length instructions and issue them several at a time to their appropriate execution resources. Any dependencies among the issued instructions are resolved through extensive dependency checking and rescheduling hardware in the processor pipeline. Some advanced processors also employ complex, dynamic scheduling techniques in hardware.

Compiler-driven speculation and predication are alternative approaches that operate through the compiler to address the bottlenecks that limit ILP. Speculative instruction execution hides latencies by issuing selected instructions early and overlapping them with other, non-dependent instructions. Predicated execution of instructions reduces the number of branch instructions and their attendant latency problems. Predicated instructions replace branch instructions and their subsequent code blocks with conditionally executed instructions which can often be executed in parallel. Predication may also operate in conjunction with speculation to facilitate movement of additional instructions to enhance parallelism and reduce the overall latency of execution of the program.

One side effect of the above-described code movement is that branch instructions tend to become clustered together. Even in the absence of predication and speculation, certain programming constructs, e.g. switch constructs and "if then else if" constructs, can cluster branch instructions in close proximity. There is thus a need for systems and methods that process clustered branch instructions efficiently.

SUMMARY OF THE INVENTION

The present invention is a method for processing branch instructions efficiently. It is generally applicable to any programming strategy that clusters branch instructions, and it is particularly useful for instruction set architectures (ISAs) that support speculation and predication.

In accordance with the present invention, one or more branch instructions are placed in an instruction bundle. The instructions are ordered in an execution sequence within the bundle, with the branch instructions ordered last in the sequence. The bundled instructions are transferred to execution units indicated by a template field that is associated with the bundle. The first branch instruction in the bundle's execution sequence that is resolved taken is determined, and retirement of subsequent instructions in the execution sequence is suppressed.

In one embodiment of the invention, branch instructions are characterized according to their complexity, and more complex branch instructions are assigned to a selected position in the bundle. In another embodiment of the invention, the branch is a return from interrupt, and control of the processor is returned to the instruction in the execution sequence following the instruction that encountered the interruption (for traps), and to the instruction that encountered the interruption (for faults). In yet another embodiment of the invention, the branch is a return from call, and control of the processor is returned to an instruction bundle following the instruction bundle that contained the original call.

BRIEF DESCRIPTION OF THE DRAWINGS

The present invention may be understood with reference to the following drawings in which like elements are indicated by like numbers. These drawings are provided to illustrate selected embodiments of the present invention and are not intended to limit the scope of the invention.

DETAILED DISCUSSION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well known methods, procedures, components, and circuits have not been described in detail in order to focus attention on the features of the present invention.

The present invention is a system and method for processing branch instructions efficiently. In accordance with the invention, branch instructions are grouped in bundles that may also include non-branch instructions. The bundled instructions are ordered in an execution sequence with the branch instructions ordered last in the execution sequence. This configuration simplifies the logic necessary to process branch instructions and facilitates suppression of issued instructions following a taken branch.

An instruction template is also provided for specifying allowed combinations of branch and non-branch instructions. The template includes a plurality of execution ordered slots, a template field, and a stop field. The template accommodates branch instructions beginning with the last slot in execution order. Instruction slot assignments are indicated by the template field, and groupings of independent instructions are indicated by the template and stop fields.

The disclosed branch processing method is particularly useful for processing code in which branch instructions are clustered in close proximity. For purposes of illustration, various aspects of the invention are described with reference to an exemplary Instruction Set Architecture (ISA) that employs predication and speculation to reduce latencies and expose ILP. The clustering of branch instructions, described below, which is a by-product of these techniques, is efficiently addressed by the present invention.

Figure 1A:
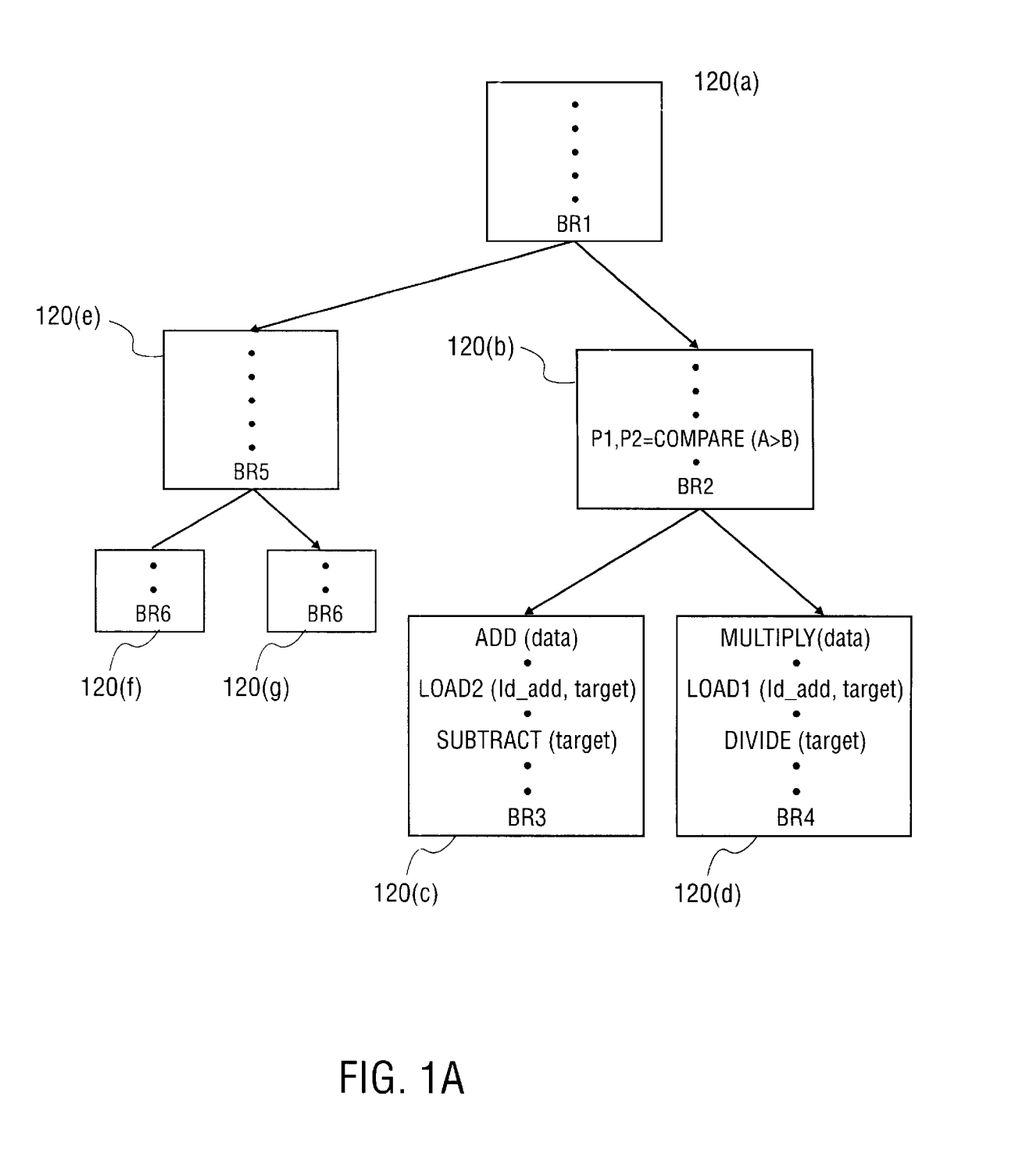
FIGS. 1A and 1B are flow diagrams of a code segment before and after modification by speculation and predication.

Referring first to FIG. 1A, there is shown a control flow diagram of a code segment 100 organized as a series of basic blocks 120(a)–120(g) (collectively, basic blocks 120). A basic block is a sequence of consecutive instructions that are executed in order from the first instruction of the sequence to the last instruction of the sequence, without the possibility of halting or branching except at the last instruction (Control transfers due to interrupts can, however, occur between instructions in a basic block). Control flow diagram 100 may represent, for example, the control flow of a code segment prior to any optimization by the compiler.

In the example, basic block 120(b) terminates with a branch instruction (BR2) and transfers control to basic block 120(c) or 120(d), depending on the branch condition that controls BR2. In one case, control flows through instructions in basic block 120(c) to a branch instruction (BR3), and in the second case, control flows through the instructions of basic block 120(d) to a branch instruction BR4. Predication allows BR2 to be eliminated and the instructions of basic blocks 120(c), 120(d) combined.

Figure 1B:
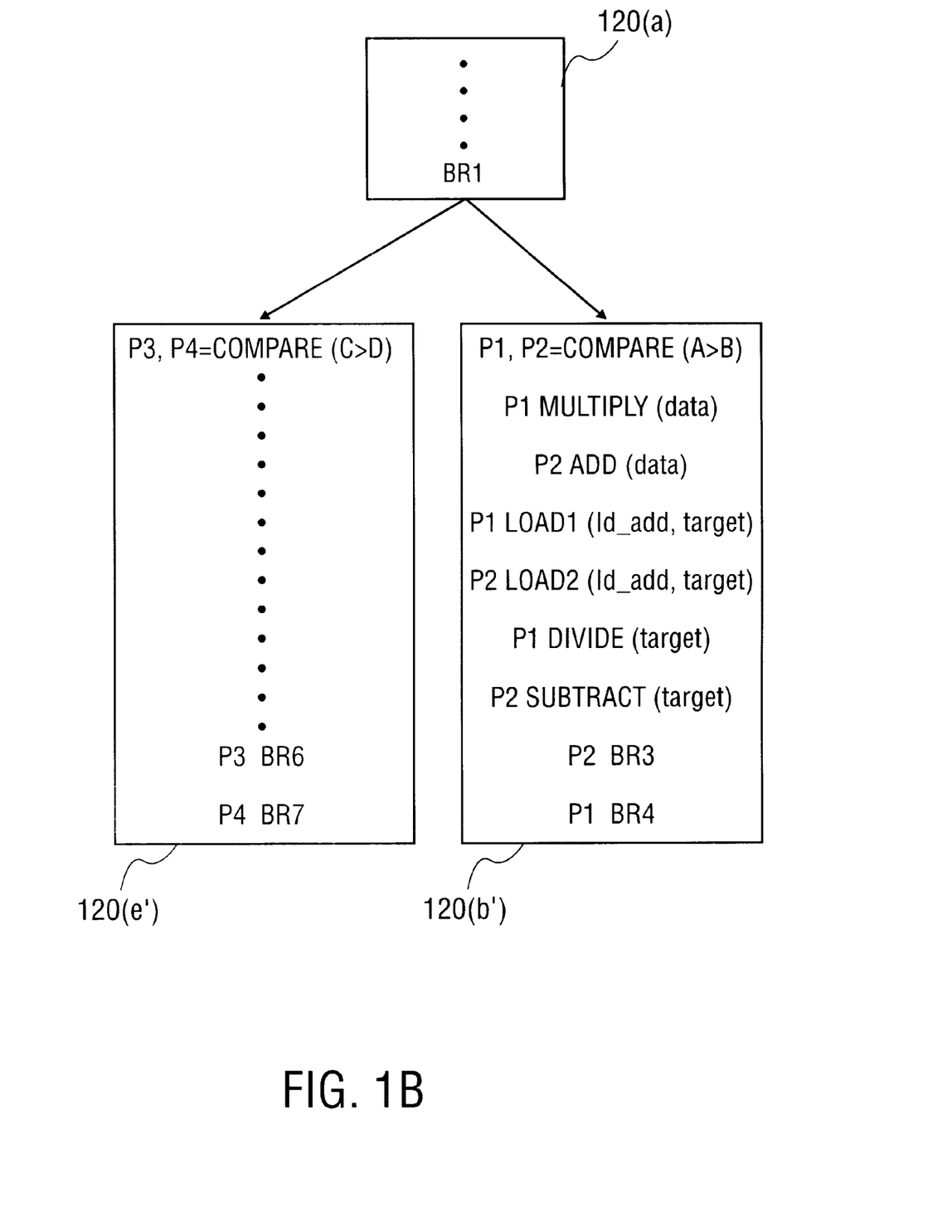

Referring now to FIG. 1B, there is shown the code of FIG. 1A following predication. Here, BR2 is eliminated. The predicate assignment (P1, P2=compare (A>B)) is used to generate predicates that control conditional execution of instructions following BR2. The instructions of basic blocks 120(c) and 120(d) are combined and predicated in basic block 120(b'). One effect of this operation is to move BR3 and BR4 together. Additional clustering of branch instructions may occur, for example, by applying predication to BR5 (FIG. 1A) and collapsing the instructions of basic blocks 120(f) and 120(g) into basic block 120(e'). Instructions may be hoisted from basic blocks 120(b') and 120(e') through speculation. In addition, the predication process may be iterated with BR1 and its daughter basic blocks 120(b') and 120(e'), further clustering branch instructions.

The exemplary ISA is now described in greater detail to provide a context in which selected features of the present invention may be illustrated. In the exemplary ISA, an instruction group is defined as a group of instructions such that all of the instructions within the group may be executed concurrently or serially with the end result being identical (assuming, however, that memory semantics are sequential). The compiler generates one or more instruction groups from a code segment using the above-described methods to reduce instruction dependencies, reduce latencies and expose ILP. The instructions of a group can be provided to processor resources for concurrent processing and retired relatively rapidly. The instructions in a group are bundled in selected combinations. This bundling, as described below, speeds up concurrent processing without requiring additional hardware. A program in this ISA comprises a sequence of instructions, packed in bundles and organized in instruction groups. The instruction groups are statically delimited by stop bits that specify inter-instruction group boundaries. For purposes of the following discussion, instruction execution can be considered to occur in four phases:

1. read the instruction from memory (fetch)
2. read the architectural state, if necessary (read)
3. perform the specified operation (execute)
4. update the architectural state, if necessary (update)

In the exemplary ISA, every dynamic instruction within an instruction group behaves as though its read of the memory state occurs after the update of the memory state of all prior instructions in the instruction group. Similarly, every dynamic instruction within an instruction group behaves as though its read of the register state occurs before the update of the register state by any instruction (prior or later) in that instruction group. Thus, within an instruction group, dynamic read after write (RAW) and write after write (WAW) register dependencies are not allowed, but dynamic write after read register dependencies are allowed. Exceptions to these restrictions are allowed for certain types of instructions.

Dynamic RAW, WAW, and write after read (WAR) memory dependencies are allowed within an instruction group. That is, a load instruction will observe the result of the most recent store to the same memory address, and in the event of multiple store instructions in the instruction group to the same address, memory will contain the result of the latest store following execution of the instruction group.

Between instruction groups, every dynamic instruction within a given instruction group behaves as though it is executed after the update of all instructions from the previous instruction group.

The exemplary ISA can support a rich instruction vocabulary that takes advantage of compile time information. To do so, instructions must be specified with sufficient bits to distinguish their function, address an expanded register set, and communicate the available compile time information. In a 64 bit ISA, instructions are preferably provided in 128 bit packets that fully specify groups of three instructions in selected combinations. These instruction groups are mapped to their appropriate execution units through templates associated with the group and are discussed in greater detail below.

It is noted that the present invention is not limited to architectures having a particular number of bits, e.g. 64 bits. However, for ease of illustration, the following discussion is presented in terms of a 64-bit architecture, with the understanding that persons skilled in the art, having the benefit of this disclosure, will recognize the modification necessary to apply the invention to other instructions sizes.

Figure 2:
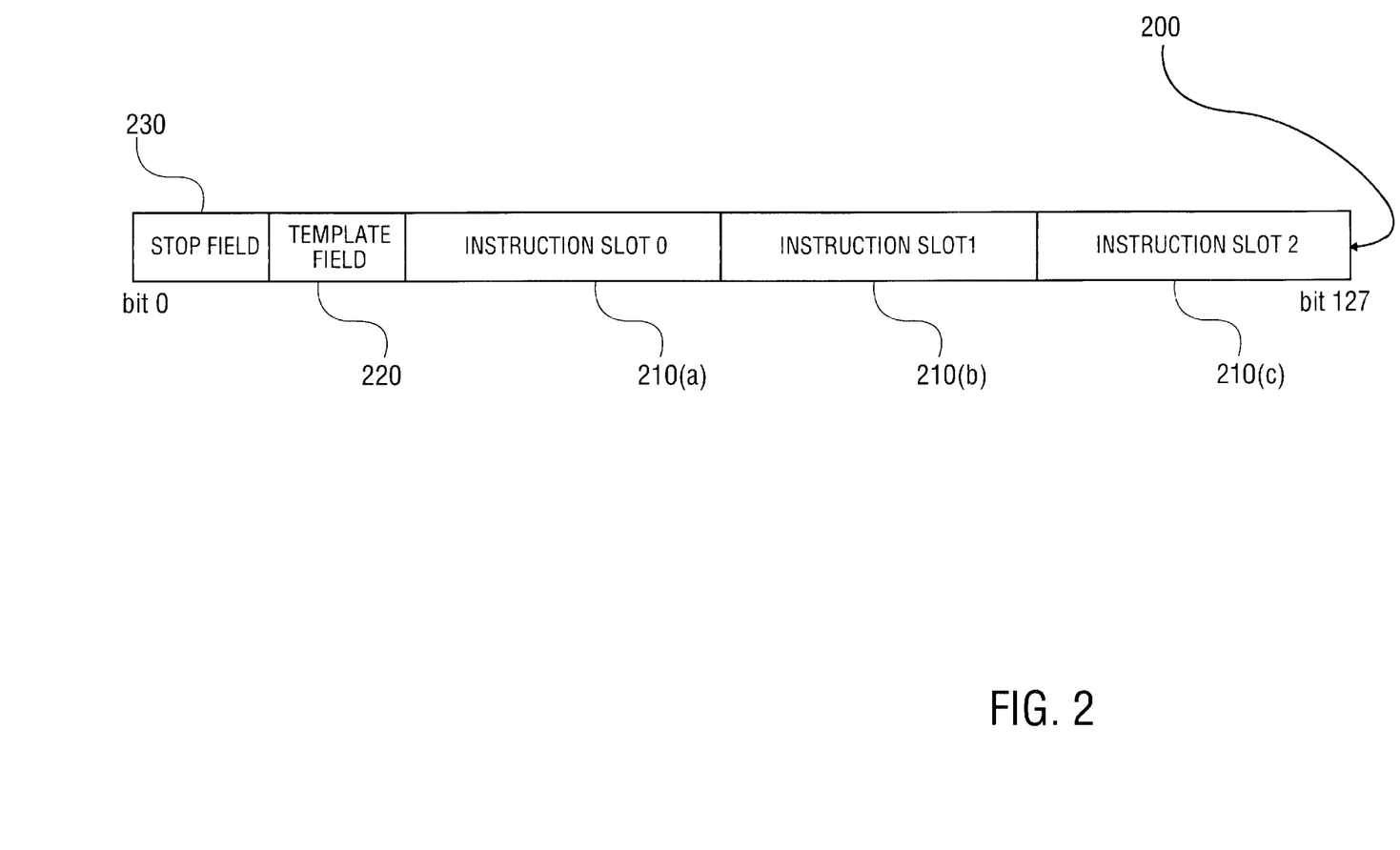
FIG. 2 is a block diagram of an instruction bundle for providing instructions to a processor pipeline in accordance with the present invention.

Referring now to FIG. 2, there is shown one embodiment of an instruction bundle 200 suitable for conveying triplets of instructions in accordance with a 64-bit implementation of the present invention. Instruction bundle 200 comprises three instruction fields or slots 210(a)–210(c) (collectively, instruction slots 210), a template field 220, and a stop field 230. Each instruction slot 210 includes an opcode field for indicating the instruction type, as well as operand fields for specifying information necessary to implement the instruction and any included compile time information (hints). Template field 220 encodes the position of any instruction group boundaries within instruction bundle 200, as well as a template type that indicates how instruction slots 210 are mapped to execution units. Here, an instruction group boundary identifies the last instruction in an instruction group as defined above. Stop field 230 indicates when an instruction group boundary coincides with the last instruction slot of bundle 200. Thus, template field 220 specifies the configuration of instructions within bundle 200, and with stop field 230, indicates the boundaries between adjacent instruction groups.

Instruction bundle 200 thus communicates a substantial amount of information. In addition to the identity of the instructions in slots 210, instruction bundle 200 indicates an execution order for the instructions (left to right semantics in the disclosed embodiment—slot0 precedes slot 1, etc.), the location of any instruction group boundaries in the bundle (via template and stop fields 220, 230, respectively), and the mapping of the instructions to corresponding execution units (via template field 220). In one embodiment of instruction bundle 200, slots 210 are 41 bits each, template field is 4 bits, and stop field 230 is one bit for a total of 128 bits.

Referring first to Table 1, there is shown a list of widely supported instruction types that are also supported in the exemplary 64-bit ISA. Here, I, M, F, and B-units refer to integer, memory, floating point, and branch execution units, respectively, suitable for executing the indicated instruction types.

TABLE 1

| INSTRUCTION TYPE | DESCRIPTION | EXECUTION UNIT TYPE |
| --- | --- | --- |
| A | Integer ALU | I-unit or M-unit |
| I | Non-ALU integer | I-unit |
| M | Memory | M-unit |
| F | Floating Point | F-unit |
| B | Branch | B-unit |
| L | Long Intermediate | I-unit |

Referring now to Table 2, there are listed instruction combinations (templates) and their corresponding template designations in one embodiment of the present invention. Vertical parallel lines between entries indicate an instruction group boundary that falls within an instruction bundle. Instruction templates, such as those of Table 2, preferably reflect those combinations of instruction/data types that arise most frequently in selected cross-section of application programs. Templates like those of Table 2 may be identified, for example, by running sample code and observing which instruction combinations occur most frequently. In the present invention, templates that include branch instructions (branch templates) also reflect hardware efficiency and timing considerations, as described below.

Templates 8, 9, B, C, and E of Table 2 each accommodate one or more branch instructions. In order to facilitate processing of instruction groups and suppression of instructions subsequent to taken branches, the branch instruction(s) are assigned beginning with the last branch from a cluster in the rightmost slot (slot2) of an instruction bundle. Preceding branches in the execution order are placed in slots to the left of the most recently placed branch. This is continued until all branches are accommodated. In the exemplary ISA, this order reflects the execution order used to evaluate instruction dependency within an instruction group.

TABLE 2

| TEMPLATE | SLOT 0 | SLOT 1 | SLOT 2 |
| --- | --- | --- | --- |
| 0 | M-Unit | I-Unit | I-Unit |
| 1 | M-Unit | I-Unit ‖ | I-Unit |
| 2 | M-Unit | L-Unit | I-Unit |
| 3 | | | |
| 4 | M-Unit | M-Unit | I-Unit |
| 5 | M-Unit ‖ | MI-Unit | I-Unit |
| 6 | M-Unit | F-Unit | I-Unit |
| 7 | M-Unit | M-Unit | F-Unit |
| 8 | M-Unit | I-Unit | B-Unit |
| 9 | M-Unit | B-Unit | B-Unit |
| A | | | |
| B | B-Unit | B-Unit | B-Unit |
| C | M-Unit | M-Unit | B-Unit |
| D | | | |
| E | M-Unit | F-Unit | B-Unit |
| F | | | |

The templates of Table 2 accommodate clusters of up to three branch instructions in a template and multiple branch templates can be employed to process branch clusters in excess of three. Program code segments are divided into one or more instruction groups. Each instruction group is divided into instruction bundles 200 for processing based on templates, such as those of Table 2. The bundled instructions of an instruction group can be issued to the execution units of a processor rapidly and without need for subsequent reconciliation of instruction dependencies. Where dependencies within an instruction sequence can not be eliminated, an instruction group boundary is inserted and bundling, in accordance with, e.g. the templates of Table 2, begins anew.

The advantages of instruction bundles 200 for concurrent processing of instructions will now be discussed. In particular, the role of exemplary branch templates 8, 9, B, C, and E, in speeding instruction execution and transitioning between instruction groups is detailed. As noted above, instruction bundle 200 can be modified appropriately to accommodate different instruction sizes and architectures. In the following discussion, a template refers to a specific configuration of instructions in an instruction bundle.

Figure 3:
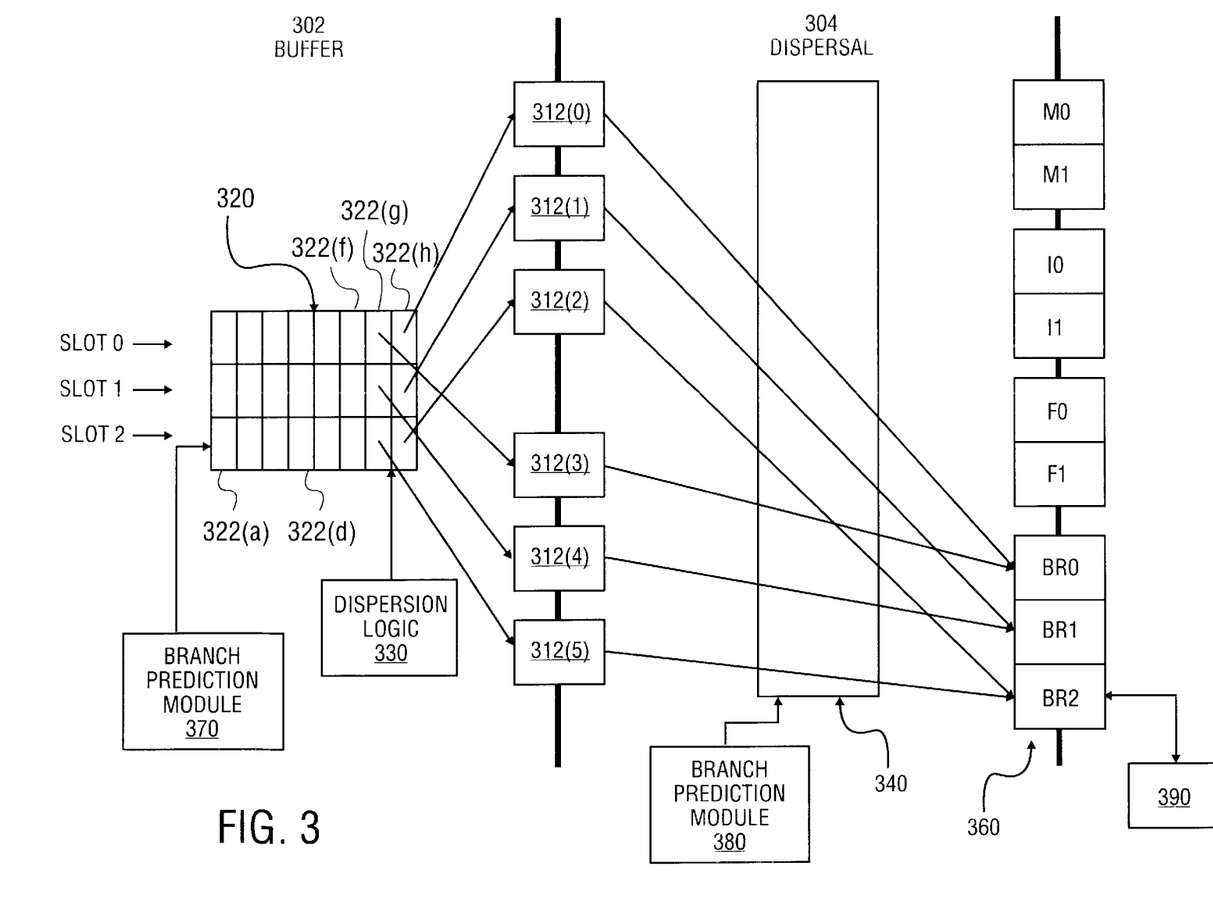
FIG. 3 is a block diagram of a processor pipeline including instruction buffer and dispersal stages suitable for implementing the present invention.

Referring now to FIG. 3, there is shown a block diagram of selected stages of a processor pipeline 300, including an instruction buffer stage 302 and a dispersal stage 304. Instruction buffer stage 302 includes an instruction buffer 320 for receiving instruction bundles 200, and dispersal stage 304 includes a dispersal network 340 for routing instructions from instruction buffer 320 to execution units (not shown) in a subsequent stage of pipeline 300. Presentation latches 312(0)–312(5) (collectively, presentation latches 312) at the boundary between instruction buffer stage 302 and dispersal stage 304 couple instructions from instruction buffer 320 to dispersal network 340. Issue ports 360 at the boundary of dispersal stage 304 couple instructions from dispersal network 340 to execution units (not shown) in a subsequent stage of pipeline 300. In the disclosed embodiment, issue ports 360 provide access to a pair of memory execution units (M0, M1), a pair of integer execution units (I0, I1), a pair of floating point execution units (F0, F1), and a triplet of branch execution units (B0, B1, B2). Other types and combinations of execution units may be implemented in pipeline 300, consistent with the present invention.

In the disclosed embodiment of pipeline 300, instruction buffer 320 comprises, e.g., eight bundle entries 322(*a*)–322(*h*) (collectively, entries 322), each having three slots designated 0 to 2 in execution order. Here, execution order is a sequential ordering from slot 0 to slot 2 that reflects the sequential ordering of instructions within an instruction group. For example, where instructions are provided using the exemplary ISA, pipeline 300 ensures that an instruction in slot 2 that reads a memory address, does so after the memory address is updated by an instruction in slot 1 or slot 0 of the same instruction bundle or by any instruction in a preceding instruction bundle of the instruction group.

In the disclosed embodiment, instruction buffer 320 is shown having 8 entries for purposes of illustration. The present invention may be implemented using buffers having more or less than 8 entries in a variety of configurations. In one embodiment, buffer 320 may be an instruction cache.

Instructions from a bundle entry 322 are provided to corresponding presentation latches 312(0)–312(2) for coupling to dispersal network 340. As indicated in FIG. 3, pipeline 300 is capable of processing instructions from two bundle entries, e.g. 322(h), 322(g), concurrently, so that up to 6 instructions can be issued per clock cycle, depending on the availability of resources. Alternative embodiments of instruction buffer stage 302 include, for example, three presentation latches, e.g. 312(0)–312(2), fed by a single entry 322, or in general, multiple latches fed by 1 or more entries 322.

The number of branch instructions that can be handled concurrently is limited only by the branch execution resources provided. In pipeline 300, up to three branch instructions from the same bundle can be executed concurrently. If an additional three branch execution units are provided, up to six branch instructions could be processed concurrently. Similar expansions are possible for each of the different types of execution units.

Dispersal logic 330 is associated with instruction buffer 320 to read a template, e.g. template field 220, associated with each instruction bundle 200 in entries 322 and provide appropriate routing information to dispersal network 340. Dispersal network 340 thus maps instructions in bundle entry 322 to issue ports 360 for different execution units, according to data provided in template field 220.

In the disclosed embodiment of pipeline 300, a first branch prediction module 370 is associated with slot 2 of bundle entries 322 to provide early access to hint information for selected branch instructions. A second branch prediction module 380 is coupled to dispersion network 340 to provide access to additional branch hint information in dispersal stage 304. In this embodiment, second branch prediction module 380 accesses data from instructions originating in any of slots 0–2 of bundle entry 322.

Referring again to FIG. 2 and Table 2, instruction bundles 200 are generated to accommodate branch instructions in slots that fall later in the execution order of the bundled instructions. For example, where the instruction group includes an isolated branch instruction, the branch instruction is assigned to slot2. Template 8, C, or D is employed, depending on the types of instructions that precede the branch instruction in execution order. Template 8 is appropriate where the branch instruction is preceded by instructions slated for a memory execution unit and an integer execution unit in execution order. Dispersal logic 330, reading template 8, e.g. in field 220, indicates to dispersal network 340 to route the instructions in slots 0, 1, and 2 to ports 360(M0), 360(I0), and 360(BR2), respectively.

Where two branch instructions are clustered, they are aligned adjacent to each other in slots 2 and 1 of an instruction bundle 200, leaving slot 0 available for a non-branch instruction, e.g. a memory type instruction. Where three branch instructions are adjacent, all three instruction slots may be assigned to the branch instructions (since three branch execution units are available to process the branch instructions concurrently).

Bundling branch instructions in later executed slots of buffer entries 322 provides a number of benefits for branch processing. For example, because taken branches resteer instruction fetch to a new address, they terminate instruction groups. This means that retirement of any instructions in the instruction group that follow the taken branch instruction in execution order, has to be suppressed. When the instructions to be suppressed are non-branch instructions, this operation imposes significant pressures on pipeline 300. For example, if memory or integer instructions followed a branch instruction in execution order in an entry 322, signal transmission from the branch execution unit (which resolves the branch) to the memory or integer unit (which suppress the memory and integer instructions) may entail significant time delays relative to the clock cycle time of the pipeline stages. Where the taken branch instruction is followed in execution order by other branch instructions in the bundle, the following branch instructions can be suppressed efficiently by the branch logic, since branch execution units are typically localized on the processor.

Another feature of the present invention is that branch instructions may be characterized according to their complexity and scheduled into selected instruction slots of entries 322, e.g. via instruction bundles 200. For example, more complex branch instructions may be scheduled into the last instruction slot in execution order (slot 2, in the disclosed embodiment). In this context, complex branch instruction are those that are likely to be resolved later in pipeline 300 and include loop branches and return from interrupt (RFI) instructions. Because these instructions are resolved later in the instruction pipeline, there is less time to suppress retirement of any (branch) instructions that follow them in an instruction bundle if the branches (loop, RFI) are resolved taken. This could lead to pipeline stalls, reducing processor performance.

Assigning complex branch instructions to a selected slot, e.g. slot 2, has the added advantage that the hardware necessary to support complex branches need only be provided at the selected slot, e.g. branch execution module 390 in FIG. 3. This reduces the complexity of branch hardware.

With the disclosed configuration, the demands on the branch prediction logic are reduced since only one branch instruction is executed per bundle. Consequently, the branch prediction logic need only predict one branch per bundle. Other advantages that flow from bundling branch instructions in accordance with the present invention and terminating instruction groups following the first taken branch in the bundle may be understood with reference to FIGS. 4A–4C.

Figure 4A:
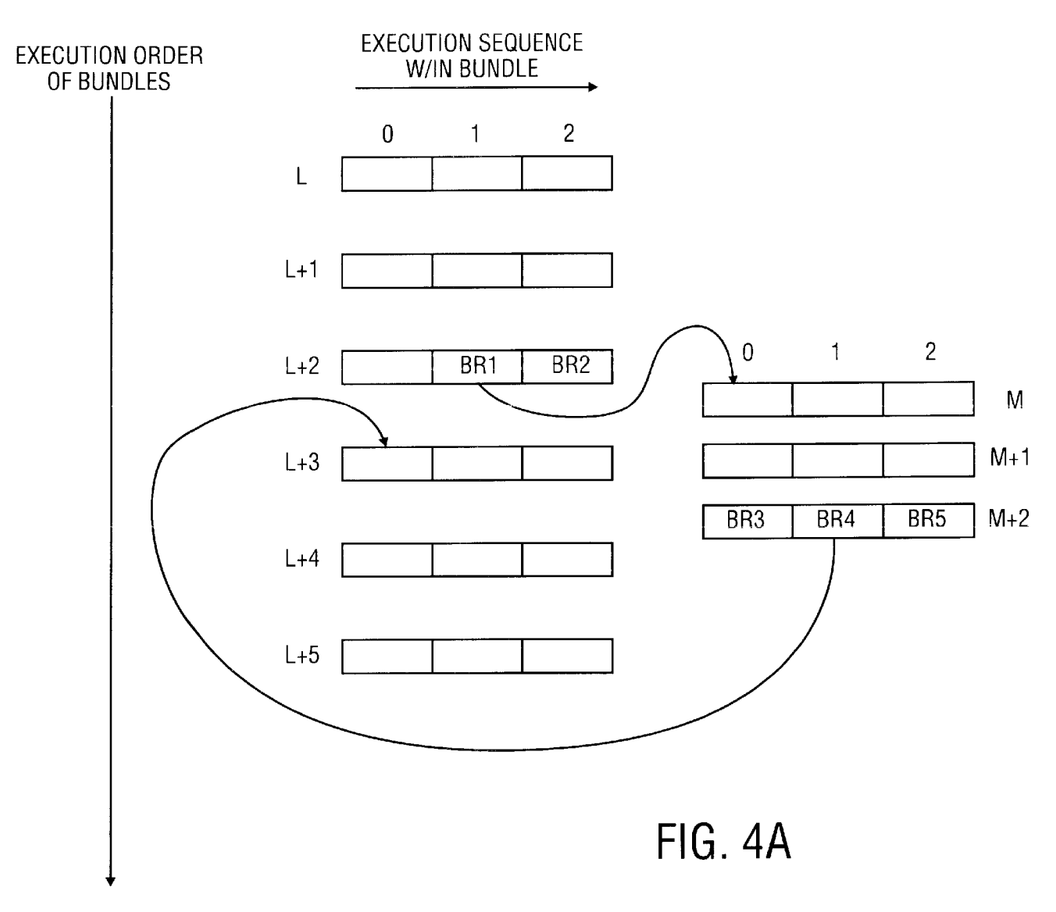
FIGS. 4A–4C are block diagrams indicating the flow of control when various branch instructions are executed in accordance with the present invention.

Referring first to FIG. 4A, there is shown a sequence of instruction bundles L, L+2 . . . L+5 representing a sequence of instructions in a program. For simplicity, it is assumed in FIGS. 4A and 4B that one instruction bundle (three instructions) executes at a time, although the 64-bit architecture discussed above can accommodate concurrent execution of multiple bundles, such as the 2 bundles shown in FIG. 3. Execution order within a bundle is from left to right (slot 0 to slot 2 within a bundle).

In the figure, bundles L through L+2 represent an instruction group (IGL) that terminates when BR1, a procedure call, is taken. The procedure is itself an instruction group (IGM) comprising instruction bundles M to M+2. The procedure executes and returns control of the processor to the instruction group represented by bundles L+3 to L+5

(IGL') when return from call (BR4) is taken (In the disclosed example, BR3 is not taken). If neither BR1 nor BR2 are taken, IGL includes the bundles of IGL'.

The configuration of branch instructions in the present invention means that when BR1 is taken, only BR2 needs to be suppressed, and since it is also a branch instruction, it can be suppressed efficiently by the same branch logic handling BR1. Similarly, when return from call (BR4) is taken, BR5 of IGM may be readily suppressed without putting pressure on the back end of the pipeline.

Another feature of the present invention is that target addresses for branch instructions are defined on bundle boundaries. Thus, call BR1 branches to slot 0 of bundle M, when taken, and call return BR4 branches to slot 0 of bundle L+3, when taken. Processing of returns from procedure calls is thus bundle granular, i.e. target addresses need not specify a slot within a bundle. This limits the number of address bits required to specify a branch target and extends the "reach" of a branch instruction.

Figure 4B:
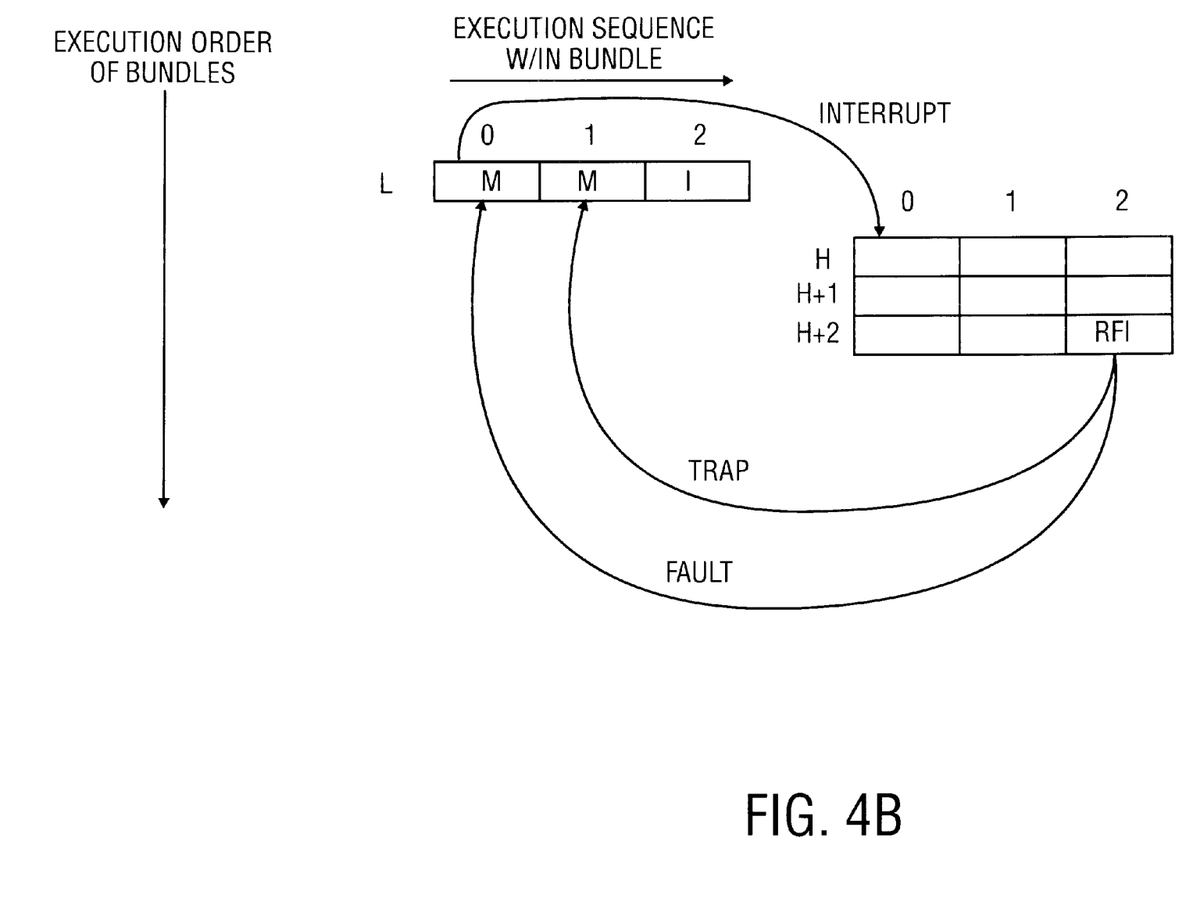

Referring now to FIG. 4B, there is shown a sequence of bundles L, H to H+2 processed during an interruption. In the figure, an interrupt triggered by execution of the memory type instruction (M) at bundle L, slot 0, passes control to an interrupt handler (Instruction group H). The interrupt handler is terminated by a return from interrupt (RFI). Unlike other branch instructions, which are bundle granular, RFI is preferably slot granular, allowing exceptions to be processed in execution order. If the interruption is a trap, as indicated in FIG. 4B, control is returned to the (M-type) instruction at slot 1 of bundle L once the instruction handler processes the trap. If the interruption is a fault, control would return the instruction that generated the fault (bundle L, slot 0). Slot granular exception handling may be accomplished by saving to a register the slot location of the instruction that was executing when the exception was encountered. The register may be read to provide a return address for a fault or read and incremented to provide a return address for a trap when the RFI is executed. Slot granular interruption processing has advantages in that it greatly simplifies interrupt exception processing.

Figure 4C:
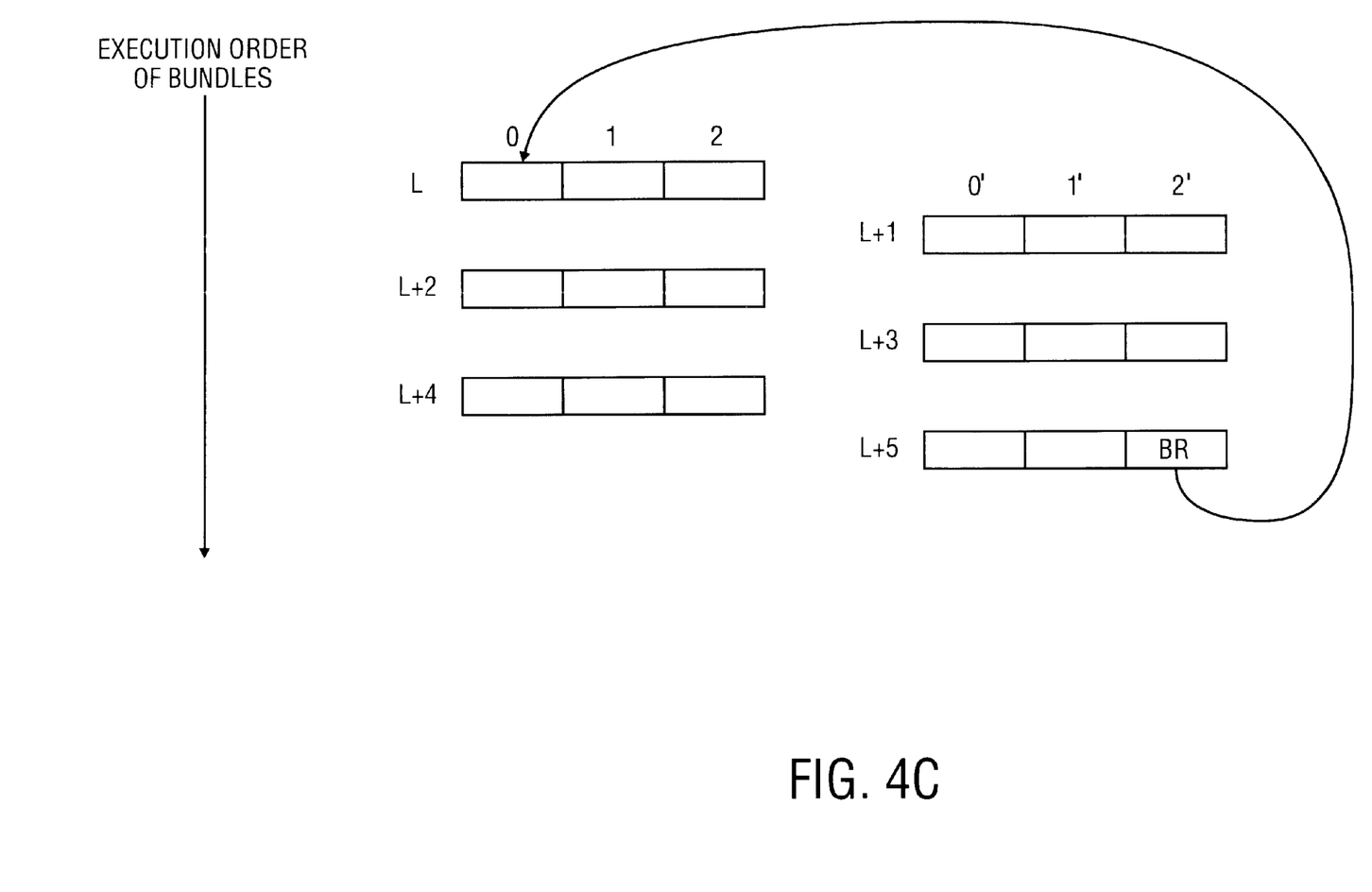

Referring now to FIG. 4C, there is shown an instruction group (IGL) comprising bundles L to L+5, where L5 terminates in a branch instruction BR6. The bundles are shown for the case of pipeline 300, where alternate bundles are fed to presentation latches 312(0)–312(5). Here, IGL represents a sequence of instructions forming a loop. Because branch instructions are scheduled later in the execution sequence of a bundle, e.g. slot 2 of bundle L+5, more instructions can be accommodated in the loop sequence without adding additional instruction bundles. In a preferred embodiment of the invention, loop branches and RFIs are considered complex branch instructions and are scheduled in slot 2. In the case of the loop branch, more instructions are accommodated in the loop for a given number of instruction bundles. In the case of an RFI, logic for reading the instruction granular return address need only be provided for slot 2.

Although the above examples disclose processing of multiple branch instructions in clusters of three or less, it is understood that the present invention may accommodate any number of clustered branch instructions concurrently. For example, a cluster of seven branch instructions could be accommodate in three instruction bundles. When the first branch instruction is resolved taken terminating, is terminated any branch instructions that follow in execution order.

Figure 5:
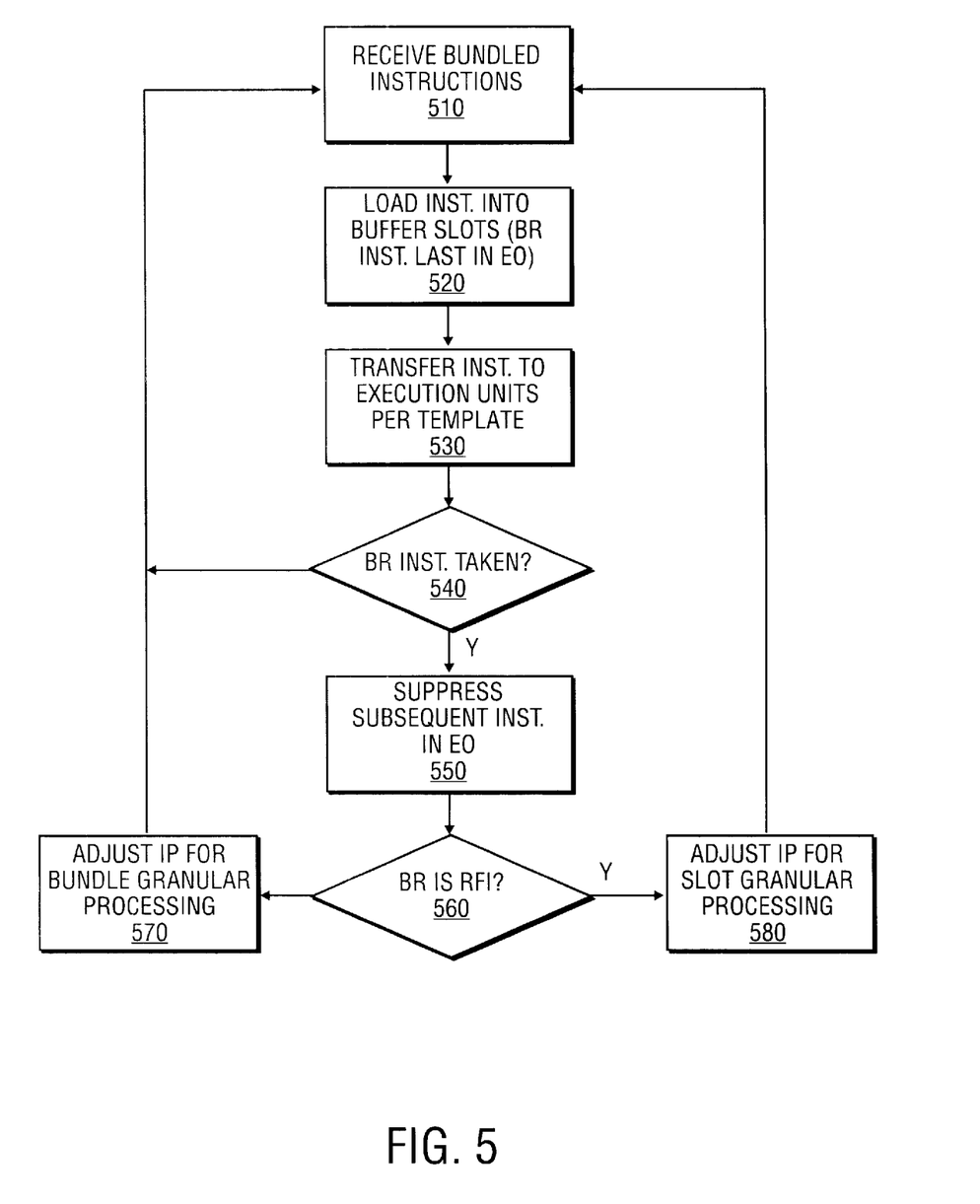
FIG. 5 is a flow chart of a method in accordance with the present invention for processing branch instructions.

Referring now to FIG. 5, there is shown a flowchart indicating a method 500 for implementing the present invention. According to method 500, an instruction bundle is received 510 and instructions are loaded 520 into an instruction buffer with any branch instructions loaded to the last slots in the execution order (EO). The instructions are then transferred 530 to appropriate execution units according to a template associated with the instruction bundle. If no branch instruction is resolved taken 540 (either because none are present or none of the branch instructions present are resolved taken), the next instruction bundle is received 510 for processing.

If a branch instruction is resolved taken 540, all subsequent instructions in the bundle execution order are suppressed 550. If the branch is determined 560 to be a return from interrupt (RFI), the instruction pointer is adjusted 580 to return control to the appropriate instruction within a bundle (slot granular). If the branch is determined 560 to be other than an RFI, the instruction pointer is adjusted 570 to return control to the appropriate instruction bundle.

There has thus been provided a system and method for processing branch instructions, whereby one or more branch instructions are provided in execution ordered instruction bundles. The branch instructions are ordered last in the execution sequence of the bundle, and the instruction assignment is indicated in a template field associated with the bundle, to speed issue to the execution units of a processor. The ordering of the branch instructions in the bundle allows for efficient suppression of instructions subsequent to a taken branch instruction. The disclosed solution enables simplification of the overall hardware necessary to support multiple branches. It also increases branch reach through bundle granular addressing of procedure calls and returns, yet maintains the simplicity of slot granular exception processing.

Selected features of the present invention have been described with reference to an exemplary ISA for purposes of illustration only. References to this ISA and to details of the particular embodiments described herein are not intended to limit the scope of the appended claims.

What is claimed is:

1. A method for compiling instructions into an N-instruction template comprising:

identifying first through $P^{th}$ branch instructions in execution order, wherein the $p^{th}$ branch instruction is a first complex branch instruction of the P branch instructions;

assigning N-P non-branch instructions that precede the P branch instructions in execution order to first (N-P) slots of the instruction template;

assigning the first through P-$1^{st}$ branch instructions to next (P-1) instruction slots of the instruction template;

assigning the first complex branch instruction to a last instruction slot of the instruction template; and assigning a value to a first field of the instruction template to indicate instruction types and slot assignments for the N instructions.

2. The method of claim 1, wherein the first complex branch instruction is a return from interrupt instruction or a loop branch instruction and assigning the first complex branch instruction to the last instruction slot comprises assigning the return from interrupt instruction or the loop branch instruction, respectively, to the last instruction slot.

3. The method of claim 2, further comprising assigning a value to a second field that indicates an instruction grouping.

4. A compiler-implemented method comprising:

identifying a sequence of branch instructions in a basic block of a computer program;

identifying a first complex branch instruction among the branch instructions;

identifying in the basic block a sequence of N instructions in execution order that terminates with the first complex branch instruction;

assigning the sequence of N-instructions to first through $N^{th}$ instruction slots, respectively, of an N-instruction bundle; and assigning a value to a template field of the instruction bundle to indicate instruction types for the N-instructions.

5. The method of claim 4, wherein identifying a first complex branch instruction among the branch instructions comprises identifying a first complex branch instruction in execution order.

6. The method of claim 5, wherein the first complex branch instruction is a return from interrupt instruction or a loop branch instruction.

7. A machine-readable medium on which are stored instructions that may be executed by a processor to implement a method comprising:

identifying a sequence of branch instructions in a basic block of a computer program;

identifying a first complex branch instruction among the branch instructions;

identifying in the basic block a sequence of N instructions in execution order that terminates with the first complex branch instruction;

assigning the sequence of N-instructions to first through $N^{th}$ instruction slots, respectively, of an N-instruction bundle; and assigning a value to a template field of the instruction bundle to indicate instruction types for the N-instructions.

* * * * *

UNITED STATES PATENT AND TRADEMARK OFFICE
CERTIFICATE OF CORRECTION

PATENT NO.    : 6,237,077 B1
DATED         : May 22, 2001
INVENTOR(S)   : Sharangpani et al.

It is certified that error appears in the above-identified patent and that said Letters Patent is hereby corrected as shown below:

<u>Column 9,</u>
Lines 62-64, delete "accommodate in three instruction bundles. When the first branch instruction is resolved taken terminating, is terminated any branch instructions that follow in execution order" and insert -- accommodated in three instruction bundles. When the first branch instruction is resolved, any branch instructions that follow in execution order are terminated --.

Signed and Sealed this

Fourth Day of June, 2002

*Attest:*

*Attesting Officer*

JAMES E. ROGAN
*Director of the United States Patent and Trademark Office*